US008264852B2

(12) United States Patent
Nelson et al.

(10) Patent No.: US 8,264,852 B2
(45) Date of Patent: Sep. 11, 2012

(54) PLUGGABLE BASES WITH DIFFERENT LEVELS OF REDUNDANCY AND METHOD FOR SAME

(75) Inventors: Matthew Allen Nelson, Gardnerville, NV (US); Erik Dylan Evans, Gardnerville, NV (US); Brandon James Rank, Minden, NV (US); Michael Alan Tart, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 868 days.

(21) Appl. No.: 12/258,710

(22) Filed: Oct. 27, 2008

(65) Prior Publication Data

US 2010/0103627 A1   Apr. 29, 2010

(51) Int. Cl.
*H01R 12/16* (2006.01)
(52) U.S. Cl. .................. 361/788; 361/801; 361/802
(58) Field of Classification Search .......... 361/788, 361/796–802, 760–764, 772, 784
See application file for complete search history.

(56) References Cited

U.S. PATENT DOCUMENTS

| 5,827,074 | A | 10/1998 | Gatti |
| 6,577,095 | B1 * | 6/2003 | Firehammer ............ 318/727 |
| 6,700,477 | B2 * | 3/2004 | Schwarz et al. ......... 340/286.01 |
| 7,242,578 | B2 * | 7/2007 | Sandy et al. ............... 361/679.4 |
| 7,394,169 | B2 * | 7/2008 | Lanus et al. .................. 307/64 |

FOREIGN PATENT DOCUMENTS

| DE | 20009207 U | 9/2001 |
| DE | 10148470 A1 | 4/2003 |
| GB | 2375895 A | 11/2002 |

OTHER PUBLICATIONS

EP Search Report for EP Application No. 09173865.8; dated Feb. 4, 2010.
Automation & Control—"Modicum Quantum Automation Platform—Unity, Concept & ProWORX 32"; Jul. 1, 2004; Schneider Electric Industries: XP002566619; p. 1/4; p. 2/3—p. 2/7; p. 2/18; p. 3/12; p. 3/46; p. 5/2—p. 5/3.

* cited by examiner

*Primary Examiner* — Tuan T Dinh
(74) *Attorney, Agent, or Firm* — Cantor Colburn LLP

(57) ABSTRACT

Apparatus includes a plurality of terminal base assemblies each having at least one module, at least some of the plurality of terminal base assemblies having varying levels of redundancy in the at least one module, the plurality of terminal base assemblies being connected together by circuitry within each of the plurality of terminal base assemblies.

16 Claims, 9 Drawing Sheets

PLUGGABLE BASES WITH DIFFERENT LEVELS OF REDUNDANCY AND METHOD FOR SAME

BACKGROUND OF THE INVENTION

The subject matter disclosed herein relates to process monitoring systems and, more particularly, to a number of pluggable bases which may be connected together in a monitoring system configuration and where the bases may comprise different levels of redundancy.

In the process industry, various processes and assets inherently have differing levels of criticality. Criticality may typically be determined by the damage resulting from failure of that asset in terms of environmental, health and safety, lost production, and the cost of replacement or repair of the asset itself. Likewise, certain measurements made using sensors applied to the assets may carry different levels of criticality. In this case, criticality is determined by the amount of time the control system or operator has to respond to the problem and whether there are other indicators of the problem. For example, the response to a thrust position failure in a gas turbine engine may require a much more rapid response time than an elevated casing vibration.

A single monitoring or control system may be applied to multiple assets of differing criticality each of which may have measurements of different criticality. The criticality of the assets and measurements drive the necessary reliability of the monitoring or control equipment. Higher reliability is typically achieved using redundancy. There are many levels of redundancy with regard to sensing, processing, etc. that may be used to achieve specific levels of reliability. For example, fully triple-modular-redundant (TMR) systems with redundant sensors may be used to provide relatively high levels of reliability. For another measurement, a single sensor may be bussed to, for example, three redundant processing modules. While this configuration does not offer as high a level of reliability as the full TMR system, the bussed sensor redundant system does exhibit significantly higher reliability than a simplex or dual redundant system because the processing module, which has the highest complexity and thus the highest probability of failure, has been made redundant.

In addition to the various sensor measurements, there may be other signals shared between the various modules of the system. These signals will include power (may be redundant), communication networks (may be redundant), machine speed timing signals, and module asset information signals. The cost of running discrete wires or cables negatively impacts the system cost due to the costs of wire termination, wire identification, and the design documentation. Also, discrete wires and connectors have a higher probability of failure than do internal electronic assembly traces and thus can cause a decrease in reliability.

There are currently several different solutions for mixed levels of redundancy, none of which are relatively well suited for the criticality issues involved. In one solution, a TMR capable system backplane structure along with a TMR capable interface module is provided. Redundant and simplex modules may be intermixed within the system, however, all modules share the expense of the redundant capable backplane and interface module infrastructure. If it is desired to bus the same sensor signal across multiple modules, external wires or an external break out board is typically used. This results in a large number of external wires. In another solution, redundant sets of individual modules each with its own sensor or bussed sensors are deployed individually, the output from each is sent to a voting module which provides the final output based on a predefined voting (such as 2 out of 3) of the signals. In yet another solution, a number of TMR processor modules provide redundant processing power for all measurements. Input and output modules may be added to the system with varying levels of redundancy, however, since the processing modules must be capable of processing all I/O signals, the TMR system carries the added cost of three high-power redundant processing modules regardless of whether all measurements need to be processed redundantly. These known systems typically reserve space for redundant I/O modules resulting in relatively large footprint space requirements.

BRIEF DESCRIPTION OF THE INVENTION

According to one aspect of the invention, apparatus includes a plurality of terminal base assemblies each having at least one module, at least some of the plurality of terminal base assemblies having varying levels of redundancy in the at least one module, the plurality of terminal base assemblies being connected together by circuitry within each of the plurality of terminal base assemblies.

According to another aspect of the invention, a method includes providing a plurality of terminal base assemblies each having at least one module, at least some of the plurality of terminal base assemblies having varying levels of redundancy in the at least one module, and connecting together the plurality of terminal base assemblies together by circuitry within each of the plurality of terminal base assemblies.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
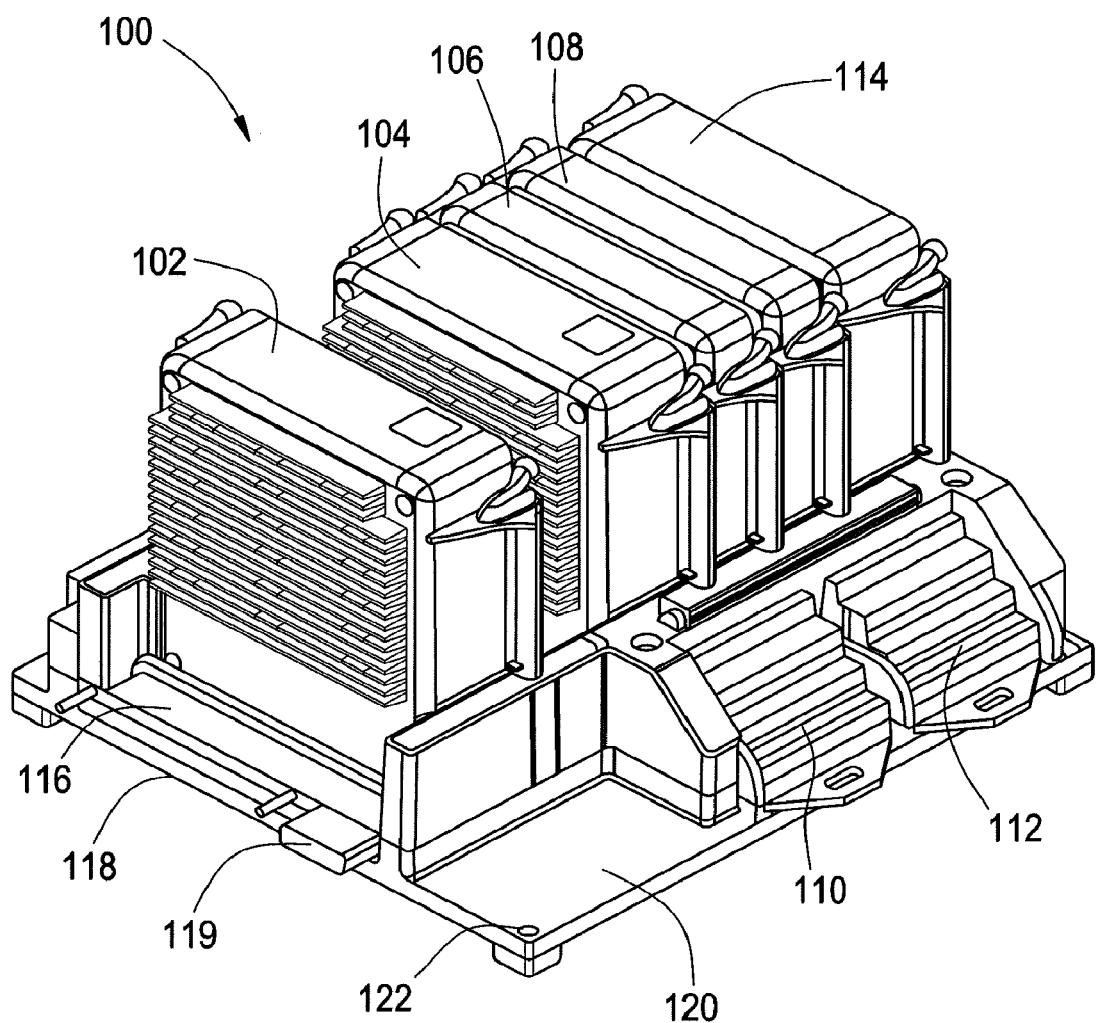
FIG. 1 is a perspective view of one type of pluggable base according to an embodiment of the invention.

Referring to FIG. 1, there illustrated is a perspective view of one type of pluggable or terminal base assembly 100 according to an embodiment of the invention. Other types of pluggable bases are disclosed and illustrated herein, with the primary differences between the pluggable bases disclosed herein being the amount of redundancy achieved within each type of base and also the functionality (e.g., number of inputs and outputs, number and type of processing modules, etc.) provided by the components that comprise each type of base. The pluggable base 100 illustrated in FIG. 1 may be part of a larger system, for example, a machinery monitoring system that monitors any number of health related measurements of different types of industrial machines (for example, the vibration of several locations on a gas turbine), as described and illustrated in greater detail hereinafter.

The pluggable base 100 illustrated in FIG. 1 may be a dual redundant type with bussed sensors. The base 100 includes two processor modules 102, 104 that plug into corresponding connectors. Each processor module 102, 104 may include a microprocessor or other signal processing component and other signal processing and/or storage devices within the module, such as analog-to-digital converters (ADCs) and memory devices. The pluggable base 100 of FIG. 1 also includes two input modules 106, 108. Each input module 106, 108 may connect with a plurality of external wire connections 110, 112 which may comprise simple hole and screw connections (e.g., a terminal strip or block) in which a wire from, e.g., a sensor, is inserted for physical connection to the module 106, 108 for input of the corresponding signal from the sensor to the input module. Alternatively, an input module 106, 108 may receive sensor signals communicated using a wireless communication method from remote sensors. The wireless communication method may comprise any type of optical or electromagnetic method such as Bluetooth or IEEE802.15.4. An input module 106, 108 may also receive sensor signals from one or more sensors placed on a bussed sensor network using a proprietary or open fieldbus communication protocol. The sensor inputs may comprise vibration, temperature, speed, pressure or other types of sensors, depending upon the application. The pluggable base 100 of FIG. 1 may also include an output module 114 that may include various types of controlled output devices, such as relay contacts. Other output types may be provided on the output module 114. Thus, the pluggable base 100 of FIG. 1 is a self-contained unit that accepts certain types of input signals, processes them, and makes the processed output signals available for use by other bases or other components of a larger system, e.g., a process monitoring system. In operation, because two processor modules 102, 104 are provided, a dual redundant configuration is implemented. Further, the processor modules 102, 104 each processes in a desired manner the signals provided to the input modules 106, 108 and provides processed signals to the output module 114.

All of the modules 102-114 may connect to a printed circuit board (PCB) 116 either directly through, e.g., soldered or press-fit connections, or via a plug that accepts the module and where the plug is connected with the printed circuit board 116. The PCB 116 contains the signal lines that connect together the various modules 102-114 within the base 100. The PCB 116 of the pluggable base 100 includes a connector 118 for signal connection with another pluggable base located on one side (i.e., to the left) of the base 100 in FIG. 1. Not shown is another connector located on the opposite (right) side of the base 100 in FIG. 1, also for connection to another pluggable base. By using an internal PCB 116 for each pluggable base and connectors 118 to connect the various bases together, the number of discrete external wires is reduced to a relatively low number (i.e., perhaps even zero externals wires), thereby providing for an increase in reliability over known designs having many externals wires and also providing for a smaller size of the pluggable base (i.e., a smaller "footprint") and, thus a smaller size of the overall system that the pluggable bases are utilized within. Another connector 119 is provided for connection to external wire connections, such as power. The PCB 116 may be mounted on a metal (e.g., aluminum) frame 120 that has four mounting holes 122 (one at each corner of the pluggable base 100) for mounting the base using bolts and within, e.g., a cabinet (FIG. 10) or in some other physical configuration or device.

As mentioned the pluggable base 100 of FIG. 1 may be an example of just one type of pluggable base according to an embodiment of the invention. Other types of pluggable bases may be provided according to various embodiments of the invention, for example, a simplex base 200 (FIG. 2) in which only one processor module 102 is provided. As such, no redundancy is provided with such a simplex base. Otherwise, the simplex pluggable base 200 is similar in most respects to the dual redundant base 100 of FIG. 1. A pluggable base in accordance with another embodiment may include three processor modules thereby providing triple module redundancy (TMR). In a still further example, the processing, input and output functions may be all combined into one single module. For a triple redundant system made from this type of combined module, a triple redundant base designed specifically for this type of module can save a relatively significant amount of physical space within the overall system. As mentioned hereinabove, the level of redundancy required or desired for a particular system depends upon the level of criticality of the assets that comprise a particular system and/or the measurements within a system.

A pluggable base may also comprise a single slot with no additional slots for sensor inputs or output signals. In this case the module plugged into the base receives and transmits all of its data over one or more networks. This type of base may be used for modules performing tasks such as communication protocol conversion, data archiving and server functions, or providing additional processing or control based on measurements made in the other system modules. Other types of pluggable bases include a power supply base that provides power at various voltages to the overall system that the bases are plugged into, and a network switch base that provides network switching functions within the overall system. Still numerous other types of pluggable bases are contemplated by embodiments of the invention.

Figure 2:
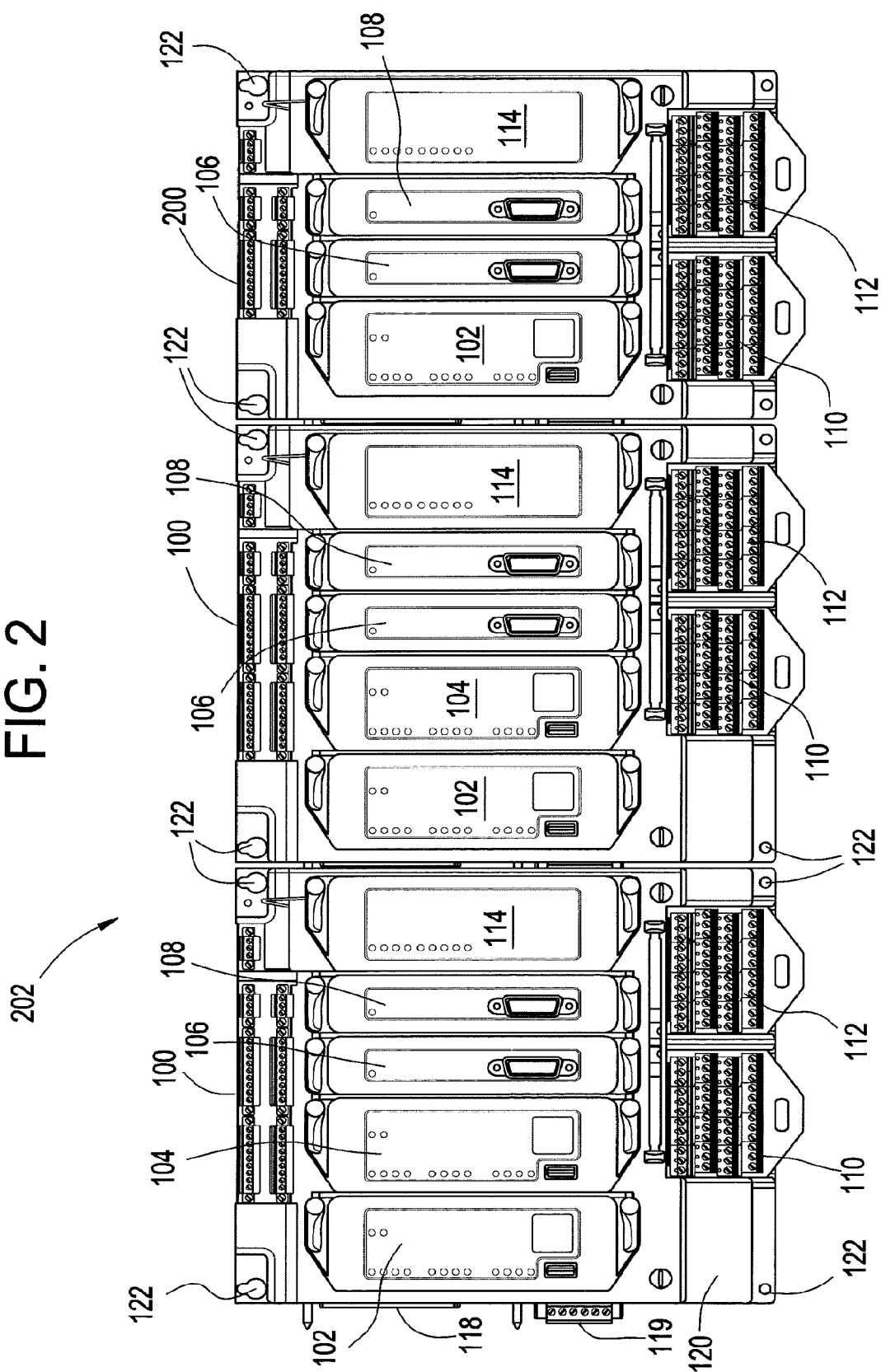
FIG. 2 is a front view of a number of two different types of pluggable bases according to embodiments of the invention connected together in an exemplary system configuration.

Referring to FIG. 2, there illustrated is a front view of three pluggable bases of two different types 100, 200 connected together according to an embodiment of the invention in an exemplary system configuration 202. In the configuration 202 illustrated in FIG. 2, the two leftmost bases 100 may comprise the dual redundant pluggable base 100 of FIG. 1. The third, rightmost pluggable base 200 in FIG. 2 may comprise the simplex base 200 having no processor redundancy, as mentioned hereinabove. The bases 100, 200 may be connected to each other by the connectors 118, which connect the communication signals between the bases 100, 200. External connections that are bussed through the system configuration 202 of FIG. 2 and can only be driven by a single source may be located on the right or left ends of the system 202. In this manner when the bases 100, 200 are plugged together, the connectors 119 between bases 100, 200 are hidden and, thus, inaccessible, and only a single access point (at the connector 119 on the left end in FIG. 2) is available for connection to external devices.

Figure 3:
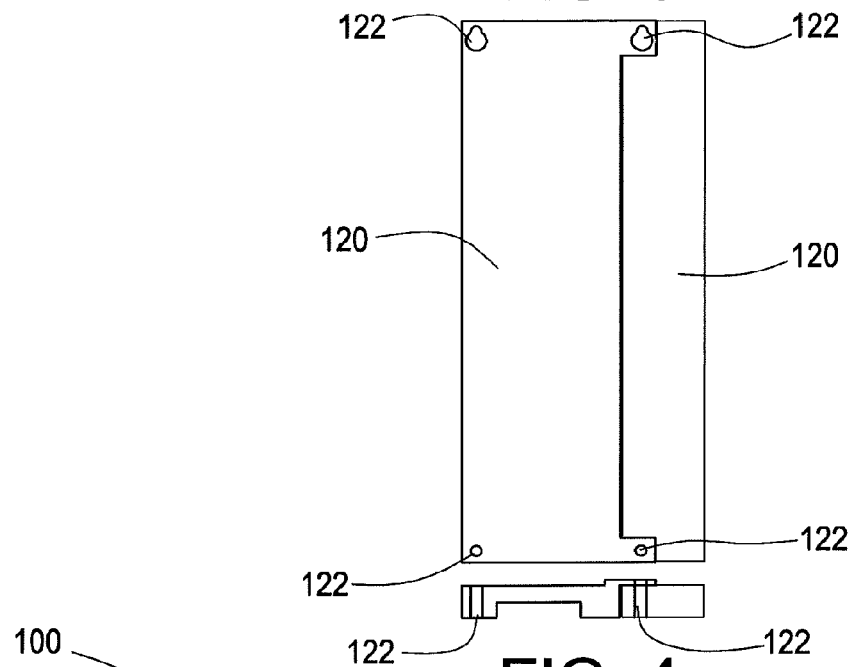
FIG. 3 is a front view illustrating a portion of a connection between two adjacent pluggable bases according to an embodiment of the invention.

Referring to FIG. 3, there illustrated is a front view showing a portion of a connection between two adjacent pluggable bases according to an embodiment of the invention. To meet certain standards, the chassis safety ground connection must be able to support a relatively high amount of electrical current, for example, up to 30 amps. This is accomplished by using the metal base plate 120 in each pluggable base and by overlapping the ends as shown in FIG. 3 so that the ends are in physical contact with one another. In addition to providing an adequate ground current path, this design also securely ties the pluggable bases together.

Figure 4:
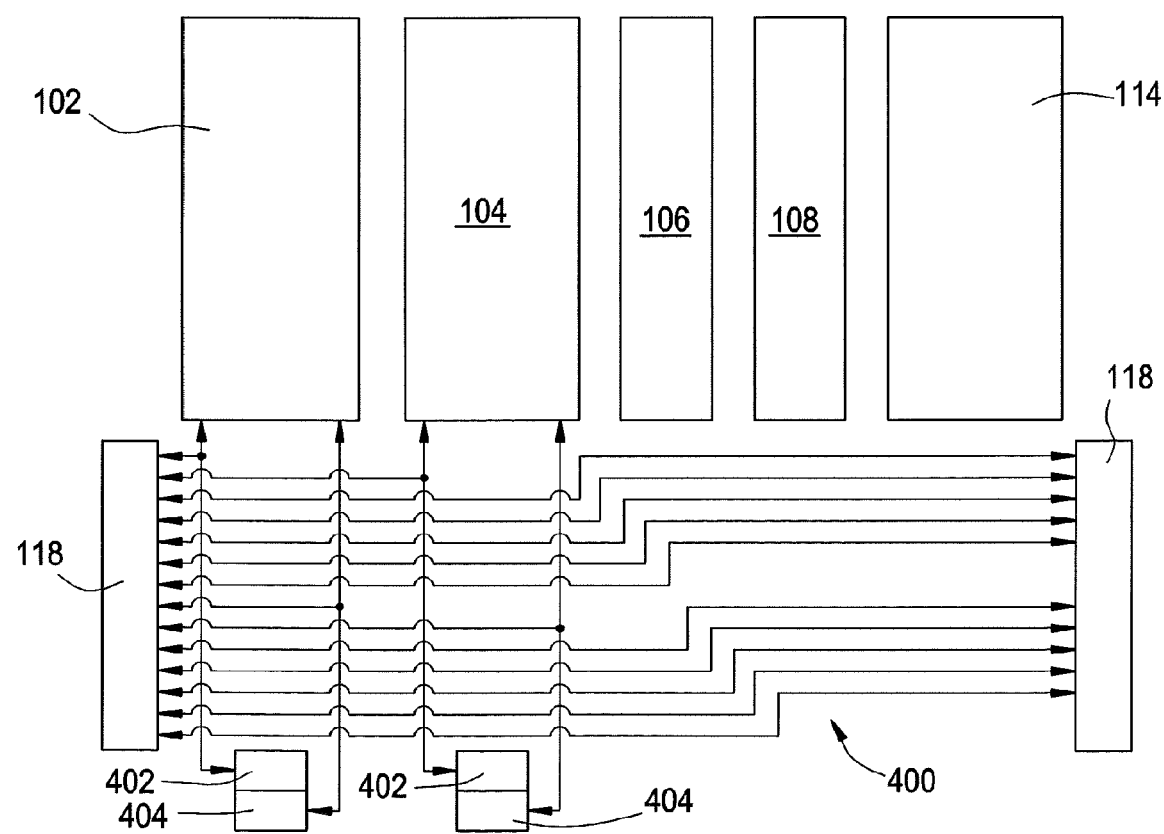
FIG. 4 is a block diagram of a pluggable base according to an embodiment of the invention illustrating a portion of the communication lines passed between modules in different bases.

Referring to FIG. 4, there illustrated is a block diagram of the dual redundant pluggable base 100 of FIG. 1 according to an embodiment of the invention. FIG. 4 illustrates a portion of the communication signal lines 400 connecting together in, e.g., a bus configuration, the various functional modules 102-108, 114 of the base 100. FIG. 4 illustrates only those signal lines 400 used for communication. Not shown are the typical connection lines within each module 102-108, 114 and between the various modules 102-108, 114 (e.g., power, non-communication signals, etc.). In an embodiment, the communication lines 400 may comprise those associated with the known Ethernet connection configuration. However, other types of communication lines may be utilized, such as PCI-Express, Rapid-IO, USB, etc. For the pluggable bases to operate together as a system, some of the lines 400 must be unique and be only driven by one module 102-108, 114. Relatively high-speed serial communication lines may comprise point-to-point connections with termination impedances at each end. Providing unique signal lines to each module 102-108, 114 is achieved by rotating the communication bus 400. The pluggable base 100 of FIG. 4 rotates the network bus according to the number of ports lines used by the processing modules 102, 104. In the example of FIG. 4, each of the two processing modules 102, 104 uses one port from each redundant pair of ports 402, 404 ("Port A", "Port B", respectively) such that each redundant pair of ports 402, 404 is rotated two positions at the corresponding connector for each port 402, 404. The port connectors may comprise separate RJ-45 connectors for each of Port A and Port B for each of the processor modules 102, 104. In another embodiment, the processor modules 102, 104 communicate wirelessly to remote network switch modules and the rotated network bus is eliminated. The wireless network switch modules may be physically plugged into the base system and thereby share system power and identification resources or may be located remotely.

Figure 5:
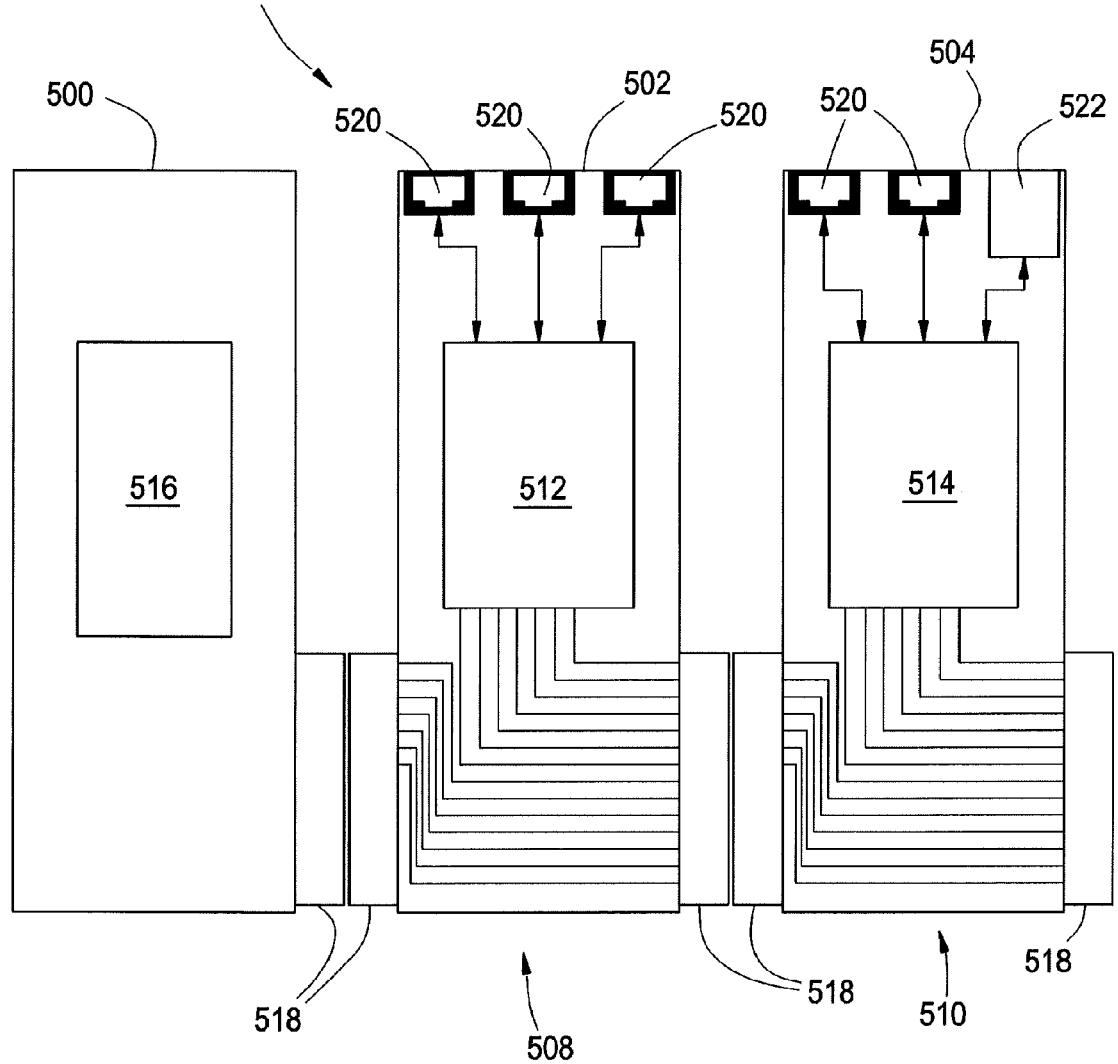
FIG. 5 is a block diagram of a number of pluggable bases according to an embodiment of the invention connected together in an exemplary system configuration and illustrating a portion of the communication lines connecting together the bases.

Referring to FIG. 5, there illustrated is a block diagram of a number of pluggable bases 500, 502, 504 according to an embodiment of the invention connected together in an exemplary system configuration 506 and illustrating a portion of the communication signal lines 508, 510 connecting together the bases 502-504. The communication lines 508, 510 connect internal simplex or redundant internal network switch/bridge modules 512, 514 within two of the bases 502, 504, respectively. The leftmost pluggable base 500 comprises a power supply module 516. The communication signal lines 508, 510 of the corresponding bases 502, 504 connect together by corresponding connectors 518, which also connect the power supply base 500 to the base 502. A number of RJ-45 connectors 520 connect to the two network switch/bridge modules 512, 514 to provide network connections to upper level networks, controllers, Historians, or other hose computers. Communication through these network ports may include proprietary or open protocols or a mixture of both. An optional fiber optic port 522 is shown provided on the rightmost network switch/bridge base 504. An SC type connector is shown but it is recognized that any connector type such as ST or MTRJ could also be used. The switch module may also employ wireless communication methods in place of the wired RJ-45 connectors and/or fiber optic connectors.

A base is provided for the network switch module that rotates the primary and secondary communication networks across the bases. With this design, the first switch 514 plugged immediate to the left of a control or monitoring (processor) base (not shown) is automatically designated as the primary (Port A) switch 514. A number (e.g., 7) of processor pluggable bases may be connected to the right of the base 504. Plugging another switch 512 to the left of the primary switch 514 automatically connects to the secondary (Port B) networks. Note that if another switch is incorrectly placed to the left of the second switch 512 that it does not connect to any of the networks and will not negatively affect network performance. In addition to the rotated communication lines, a local network plug 518 is provided near each module to allow a base to operate stand-alone if desired.

Figure 6:
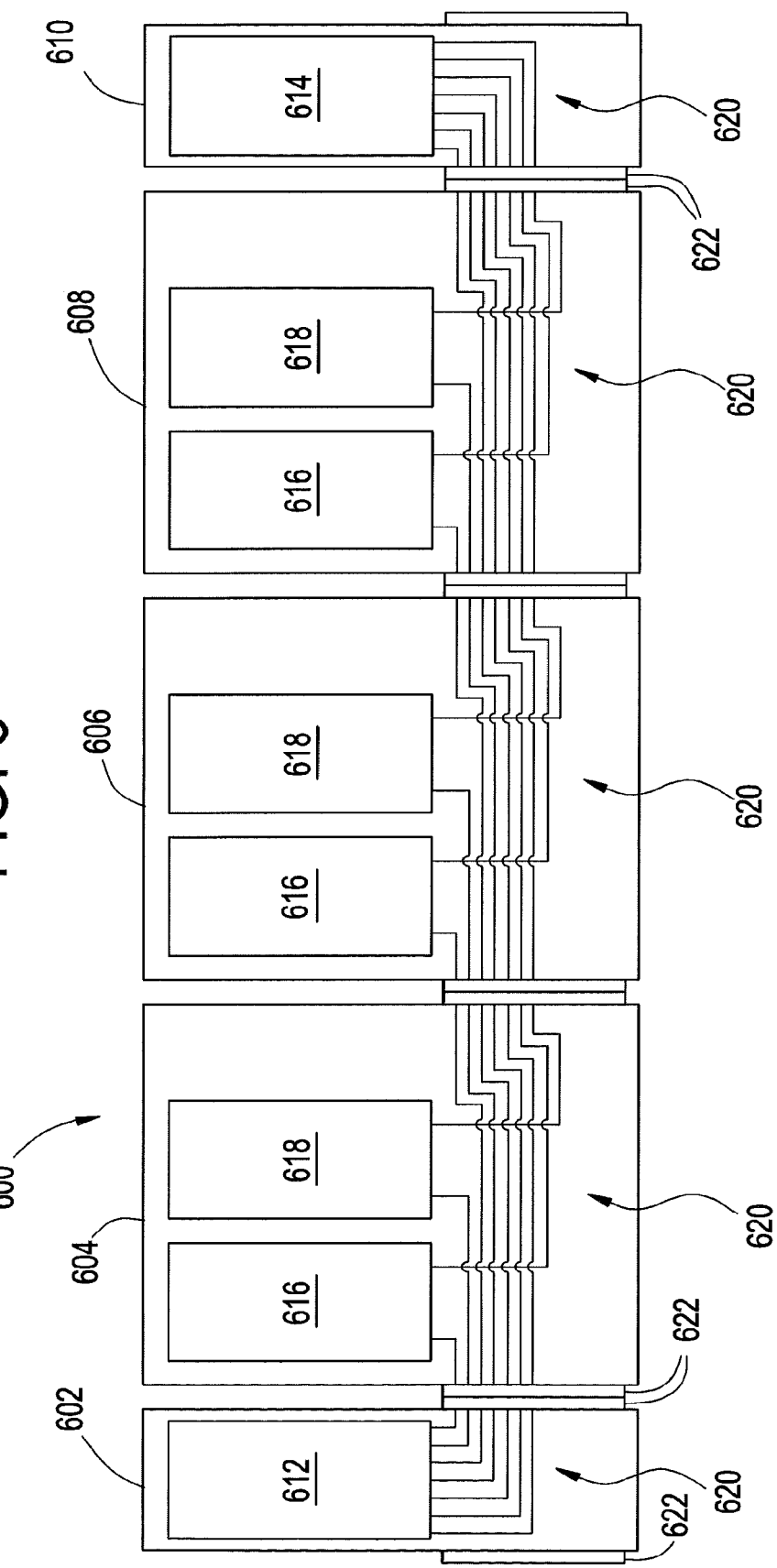
FIG. 6 is a block diagram of a number of pluggable bases according to another embodiment of the invention connected together in an exemplary system configuration and illustrating a portion of the signal lines within each base and connecting together the bases.

Referring to FIG. 6, there illustrated is a block diagram of a system configuration 600 according to an embodiment of the invention that includes a number of pluggable bases 602-610 connected together. In this embodiment, dual redundant networks are routed in both directions (i.e., left to right, and right to left in FIG. 6). The bases 602, 610 on the far left and far right in FIG. 6 comprise power supply modules 612, 614, respectively. Each of the three pluggable bases 604-608 in between the bases 602, 610 includes a pair of redundant processor modules 616, 618. The Ethernet signal lines 620 are illustrated as being connected between the various modules 602-610 by corresponding connectors 622. The primary network is located on the left in FIG. 6 and the secondary network is located on the right in FIG. 6. In this case, a switch base plugged into the left side automatically becomes the primary network switch and a switch base plugged into the right base becomes the secondary network switch. This embodiment has the added benefit of a reduction in pins required between bases.

Figure 7:
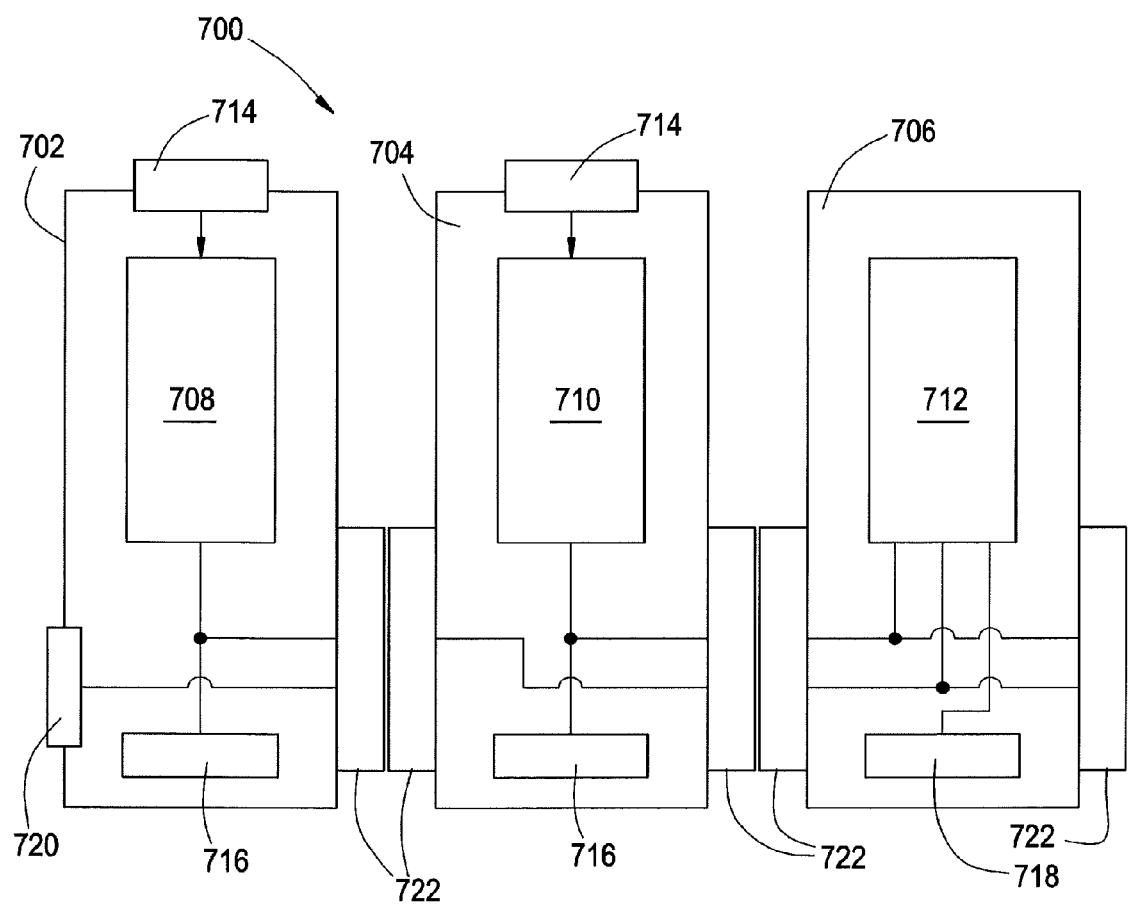
FIG. 7 is a block diagram of a number of pluggable bases according to yet another embodiment of the invention connected together in an exemplary system configuration and illustrating a portion of the signal lines within each base and connecting together the bases.

Referring to FIG. 7, there illustrated is a block diagram of a system configuration 700 according to yet another embodiment of the invention. The configuration 700 includes a number of pluggable bases 702, 704, 706 connected together. The two leftmost bases 702, 704 comprise power supply modules 708, 710, respectively. The rightmost base 706 comprises a network switch that includes a network switch module 712. Line power 714 is provided to the two bases 702, 704 and each base 702, 704 includes power out 716. An additional switch power input 718 is provided to the network switch module 712 so that the switch may remain powered when power is removed from modules 702 and 704 as in the case when servicing the modules. A supply in connector 720 is provided on the leftmost base 702, while the connectors 722 that connect together the bases 702-706 are also shown. The network switch module 712 may comprise an Ethernet network switch and may be managed or unmanaged. A managed switch typically would also include a processor. In the alternative, the network switch module 712 may comprise a network hub, a bridge, a router or a gateway.

The base 706 is optimized for use with the redundant power supplies 708, 710 as part of the bases 702, 704, respectively. The power supply inputs are rotated through the base 706 such that the first power supply base 704 plugged to the left of processor base 706 is automatically assigned as the primary. An additional power supply base 702 plugged to the left of the power supply base 704 is automatically designated as the secondary. The connector 720 is provided on the side of the power supply base 702 and is connected to the rotated power supply 708. In this way, a single power supply module 710 may be plugged into the corresponding base 704 and be designated as the primary and an external power supply, such as a battery backed up uninterruptible power supply can be connected as the input for the secondary supply 708. Note that with the rotation if both the primary and secondary power supplies 710, 708 have been plugged together then the external power supply connector is unconnected and connecting a power source to the connector 720 does not affect the system 700. The internal power supply also outputs a digital level signal that is in phase with the input AC line frequency. This signal is made available to the plugged in base for use by the processing modules 102 and 104 (FIG. 1) to synchronize processing to the line frequency. This synchronization is useful when processing signals from machinery tied to the grid such as generators or AC powered motors. Other control and timing lines that must be uniquely driven by a single source are also rotated similarly to the network lines. Lines which may be driven by any monitor (such as in a negative logic, wired OR configuration) are run straight through the bases 702-706 without rotation.

Figure 8:
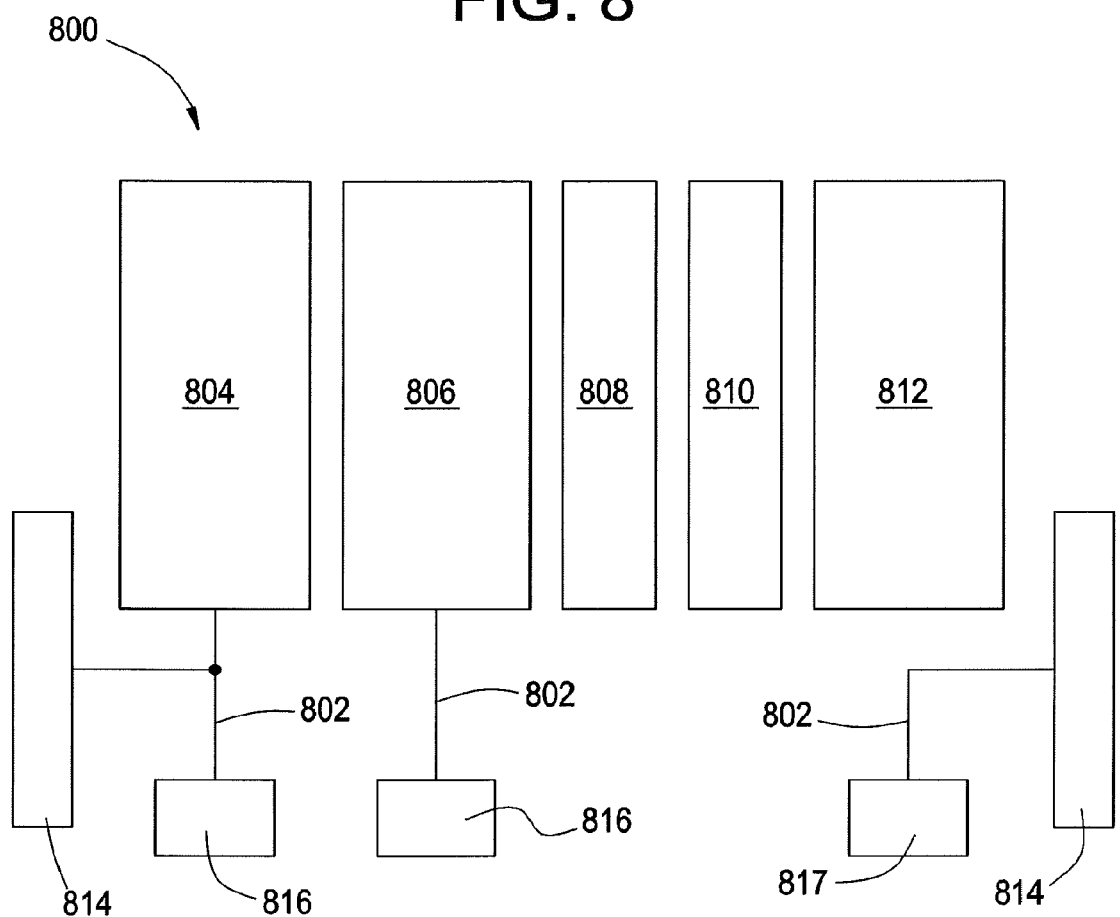
FIG. 8 is a block diagram of a pluggable base according to another embodiment of the invention illustrating a portion of the signal lines connecting together the functional modules of the base.

Referring to FIG. 8, there illustrated is a block diagram of a pluggable base 800 according to another embodiment of the invention. FIG. 8 illustrates a portion of the signal lines 802 connecting together the functional modules of the base 800. These modules includes a pair of processing modules 804, 806, a pair of input modules 808, 810, and an output module 812. A pair of connectors 814 for connection to other bases is also illustrated. When a system such as a process monitoring system comprises variable bases, the system should be able to determine what bases make up the system. This capability is provided by several programmed identification devices 816 and 817 within a pluggable base 800. These devices 816 may be programmed with various information, for example, the base type, asset information such as part number and serial number, and the slot number that the processor module is plugged to. Device 817 indicates base type to an adjacent base. The information stored in the devices 816 is sufficient for Host computer retrieving the information to provide the user a presentation, graphical or otherwise, showing the groupings, special arrangements and types of modules. In an embodiment, the identification is based on a read only memory device 816, 817 using a single wire technology that is commercially available, although it is recognized that any other memory type device and interface could be used.

Figure 9:
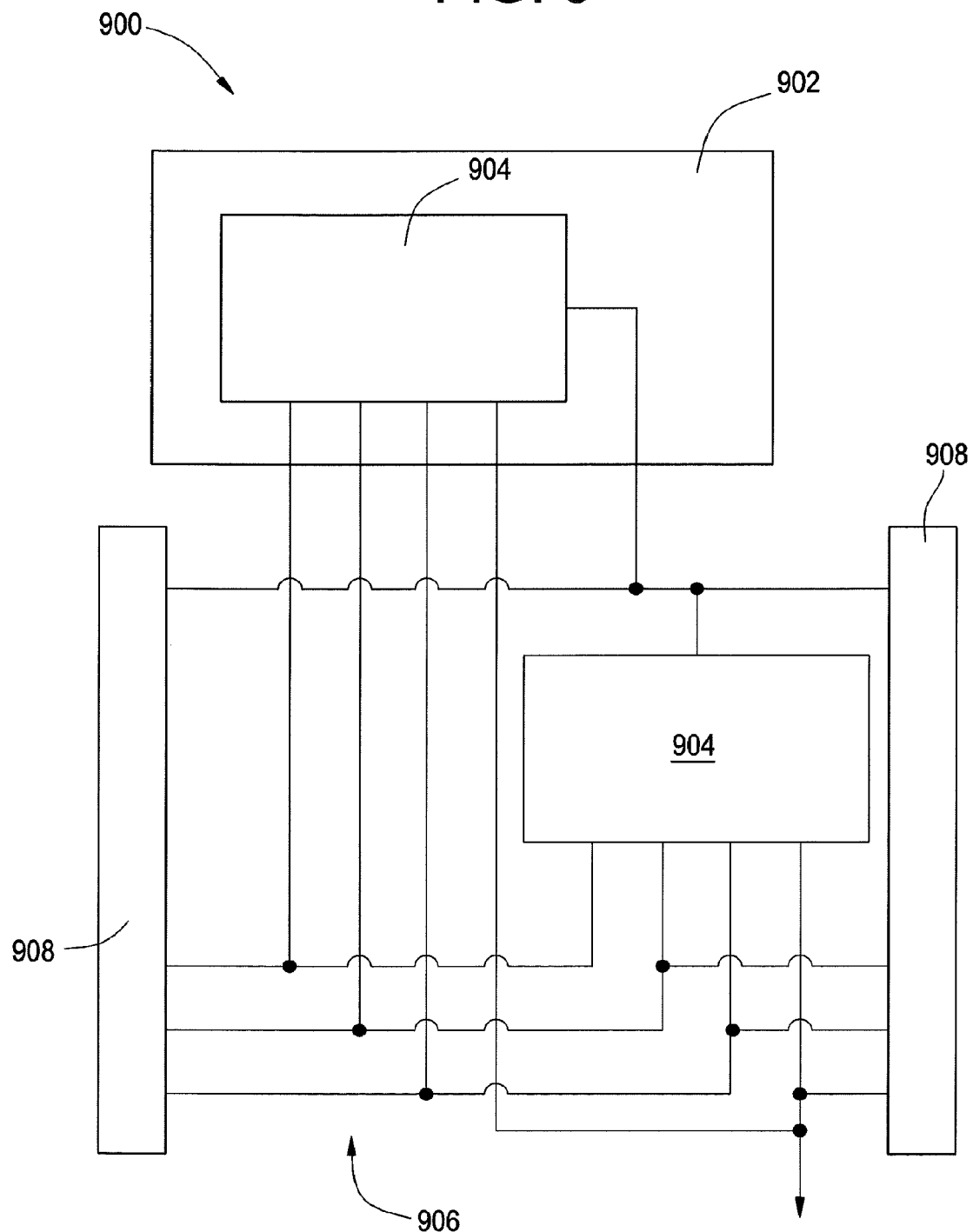
FIG. 9 is a block diagram of a pluggable base according to yet another embodiment of the invention illustrating a portion of the signal lines connecting together the functional modules of the base.

Referring to FIG. 9, there illustrated is a block diagram of a pluggable base 900 according to yet another embodiment of the invention. When unintelligent devices, such as a power supply 902 in FIG. 9, are plugged in next to (e.g., to the left of) a processing module, the overall system needs to determine the relative location of these unintelligent bases within the system. The location information combined with information stored in the devices 904 is sufficient for a Host computer retrieving the information to provide the user a presentation, graphical or otherwise, showing the groupings, special arrangements and types of modules. The first processing module to the right of the unintelligent modules gathers the asset information from the adjacent bases using a rotated addressing scheme. This scheme provides a unique address to each base as it is plugged in and allows each base and power supply to uniquely identify itself to the processing module. The power supply module 902 may provide power to one of multiple power supply distribution lines based on the relative location of the power supply module 902 with respect to any other power supply modules connected within the overall system. FIG. 9 illustrates the one-wire devices 904, the signal wires 906 that connect the one-wire devices 904 with the base 900, and the external connectors 908 that connect the base 900 to other bases.

Figure 10:
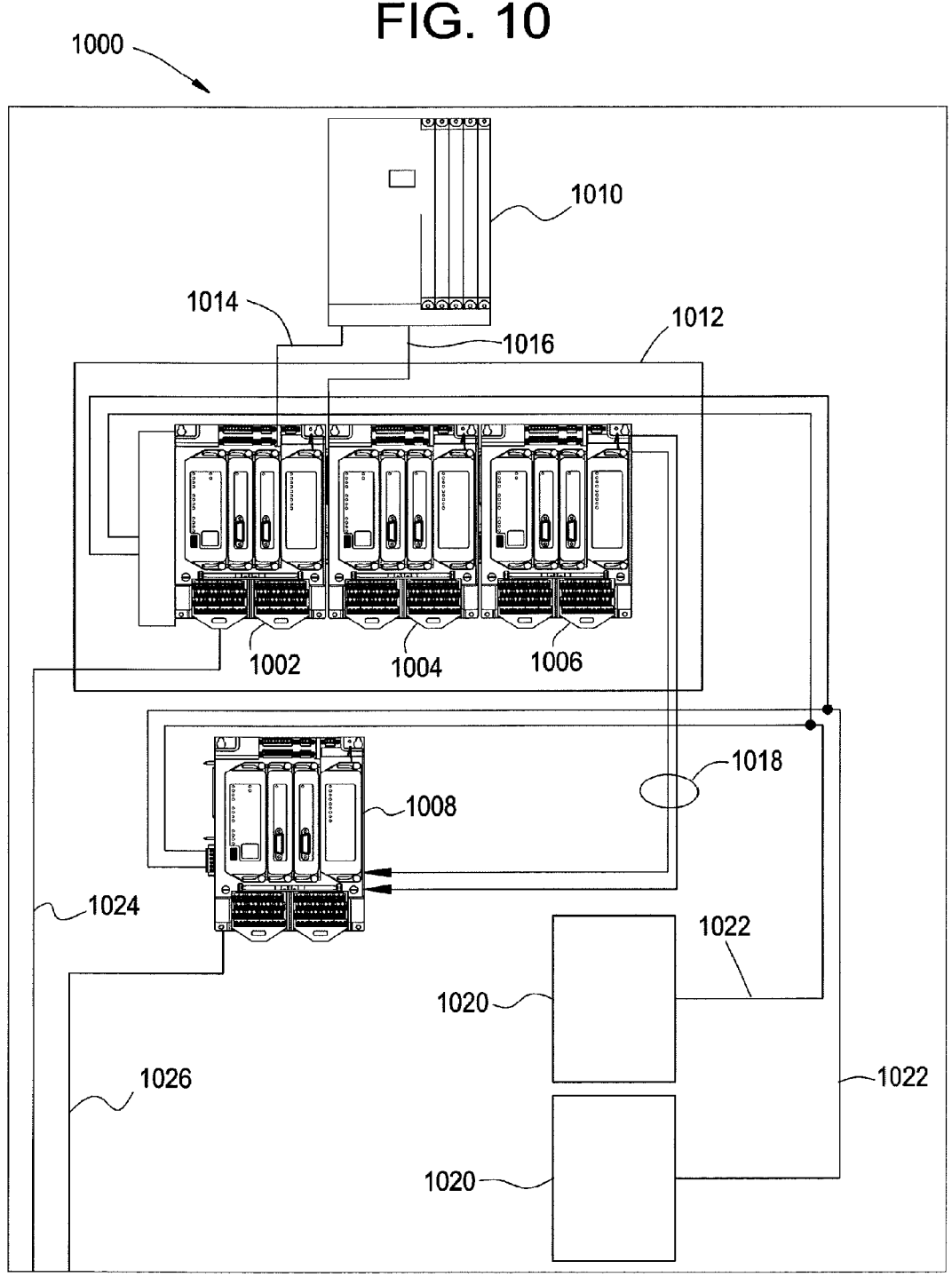
FIG. 10 is a block diagram of an embodiment of a cabinet having a number of pluggable bases according to an embodiment of the invention connected together and to other components within the cabinet.

Referring to FIG. 10, there illustrated is a block diagram of an embodiment of a cabinet or some other type of enclosure 1000 having a number of pluggable bases 1002-1008 connected together according to an embodiment of the invention and to other components within the cabinet 1000. The cabinet 1000 also includes a controller 1010 that may comprise a computer-controlled device. A configuration 1012 of three of the pluggable bases 1002-1006 connected together according to an embodiment of the invention has an input signal line 1014 that connects the configuration 1012 with the controller 1010. Also, a signal line 1016 with the status of the relay contacts from an output module on one of the pluggable bases 1002 connects to the controller 1010. Adequate clearance is provided around the configuration 1012 for ventilation purposes. A pair of timing signal lines 1018 used to measure shaft rotative speed and provide reference for measuring vibration phase lag angle connects between the bases 1006, 1008. A pair of power supplies 1020 provides electrical power on lines 1022 to the bases 1002-1008. Sensor wiring lines 1024, 1026 exit from each of the corresponding bases 1002, 1008.

Embodiments of the invention provide compact and flexible pluggable bases that support different levels of redundancy and address the need for a system that provides a method for combining modules with varying levels of redundancy and channel count into a system with shared signals while requiring only minimal external discrete wiring and minimal space. The system is expandable from a single simplex unit up to multiple redundant units. Simplex and redundant bases may be mixed within the same system. The system automatically detects the type of bases plugged together and automatically designates system resources, such as power supplies, as primary and secondary. Embodiments of the invention allow the user to mix varying levels of redundancy within a single system with shared processing, communication, control, power supply, input/output, switch and/or timing signal resources. Embodiments of the invention provide a method for optimizing space usage by providing bases specifically designed for the redundancy and input/output requirements for the function while maintaining the majority of the wiring on internal traces. Thus, these embodiments significantly decrease the amount of external wiring terminations required versus known competing solutions while improving overall integration and scalability and at the same time simplifying the functionality provided.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An apparatus, comprising:
a plurality of terminal base assemblies each having at least one module, at least some of the plurality of terminal base assemblies having varying levels of redundancy in the at least one module, the plurality of terminal base assemblies being connected together by circuitry within each of the plurality of terminal base assemblies,
communications signals are configured to rotate among the plurality of terminal base assemblies in response to the at least one module being disposed in one of the plurality of terminal base assemblies as a controller;
the plurality of terminal base assemblies being connected together by communication signals within each of the plurality of terminal base assemblies;
wherein some of the communication signals are driven by only one of the at least one module, thereby providing unique ones of the communication signals to each of the at least one module.

2. The apparatus of claim 1, the at least one module being from the group that comprises an intelligent module and an unintelligent module.

3. The apparatus of claim 1, the at least one module comprising a processor module, the processor module being from the group that comprises a redundant processor module and a non-redundant processor module.

4. The apparatus of claim 1, the at least one module comprising a network switch module.

5. The apparatus of claim 1, the at least one module comprising at least one of an input module and an output module.

6. The apparatus of claim 1, wherein the one of the at least one module driving some of the communication signals rotates the communication signals according to a number of port lines used by any one or more processor modules that comprise the at least one module.

7. The apparatus of claim 1, wherein when the at least one module comprises at least one processor module, the at least one processor module communicates wirelessly to at least one remote wireless network switch module.

8. The apparatus of claim 1, wherein the communication signals comprise high-speed serial communication point-to-point signal lines having termination impedances at each end.

9. The apparatus of claim 1, the at least one module comprising a power supply module.

10. The apparatus of claim 1, at least some of the terminal base assemblies each having a programmed identification device having information about the corresponding one of the terminal base assemblies, wherein the information about the corresponding terminal base assembly allows a host computer that retrieves the information to provide a user with a presentation regarding the plurality of terminal base assemblies.

11. The apparatus of claim 5, wherein the input module receives one or more input signals through either wired connections and/or wireless connections.

12. The apparatus of claim 9, wherein the power supply module includes information regarding a location of the power supply module within the plurality of terminal base assemblies.

13. A method, comprising:
providing a plurality of terminal base assemblies each having at least one module, at least some of the plurality of terminal base assemblies having varying levels of redundancy in the at least one module; and
connecting together the plurality of terminal base assemblies together by circuitry within each of the plurality of terminal base assemblies, and communications signals are configured to rotate among the plurality of terminal base assemblies in response to the at least one module being disposed in one of the plurality of terminal base assemblies as a controller;
connecting together the plurality of terminal base assemblies comprises connecting together communication signals within the plurality of terminal base assemblies, and
further comprising driving some of the communication signals by only one of the at least one module, thereby providing unique ones of the communication signals to each of the at least one module.

14. The method of claim 13, wherein driving the one of the at least one module comprises rotating the communication signals according to a number of port lines used by any one or more processor modules that comprise the at least one module.

15. The method of claim 13, further comprising communicating wirelessly between at least one processor module and at least one remote wireless network switch module.

16. The method of claim 13, further comprising providing at least some of the terminal base assemblies with a programmed identification device with information about the corresponding one of the terminal base assemblies, wherein the information about the corresponding terminal base assembly allows a host computer that retrieves the information to provide a user with a presentation regarding the plurality of terminal base assemblies.

* * * * *